United States Patent
Li et al.

(10) Patent No.: US 8,757,256 B2
(45) Date of Patent: Jun. 24, 2014

(54) ORBITAL DOWNHOLE SEPARATOR

(75) Inventors: Liping Li, Dallas, TX (US); Syed Hamid, Dallas, TX (US); Harry D. Smith, Jr., Montgomery, TX (US); Jim B. Surjaatmadja, Duncan, OK (US); Robert K. Michael, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 734 days.

(21) Appl. No.: 11/769,640

(22) Filed: Jun. 27, 2007

(65) Prior Publication Data

US 2007/0295506 A1    Dec. 27, 2007

Related U.S. Application Data

(62) Division of application No. 10/692,564, filed on Oct. 24, 2003, now abandoned.

(51) Int. Cl.
*E21B 43/00* (2006.01)
*E21B 43/38* (2006.01)

(52) U.S. Cl.
USPC ........................................ 166/265; 166/105.5

(58) Field of Classification Search
USPC .......... 166/53, 68, 105, 105.5, 106, 266, 265, 166/369
See application file for complete search history.

(56) References Cited

U.S. PATENT DOCUMENTS

| | | | |
|---|---|---|---|
| 4,241,787 A | 12/1980 | Price | |
| 4,296,810 A | 10/1981 | Price | |
| 5,127,457 A | 7/1992 | Stewart et al. | |
| 5,149,432 A | 9/1992 | Lavin | |
| 5,156,586 A | 10/1992 | Fitch | |
| 5,195,939 A | 3/1993 | Gingras | |
| 5,240,073 A | 8/1993 | Bustamante et al. | |
| 5,296,153 A | 3/1994 | Peachey | |
| 5,370,000 A | 12/1994 | Herwig et al. | |
| 5,370,600 A | 12/1994 | Fitch, Jr. et al. | |
| 5,389,128 A | 2/1995 | Lopes | |

(Continued)

FOREIGN PATENT DOCUMENTS

EP       0834342 B1   2/2003
GB       2 395 504    5/2004

(Continued)

OTHER PUBLICATIONS

C. C. Jensen A/S, Lovholmen 13, 5700 Svendborg, Denmark, "CJC™ Filter Separators," 2 pages <http://www.cjc.dk/index.php?m=p&pid=34>, visited Sep. 27, 2004.

(Continued)

*Primary Examiner* — Daniel P Stephenson
(74) *Attorney, Agent, or Firm* — Scott F. Wendorf; Fish & Richardson P.C.

(57) ABSTRACT

An orbital downhole separator for separating well fluids into constituents of different specific gravities. Specifically, it is designed to separate water from oil or gas. The apparatus comprises a housing with a rotating member therein driven by a motor in the housing. Well fluid flows through the rotating member and is subjected to centrifugal force to separate the components. A flow conditioner is used to facilitate separation. The invention includes several different versions of the flow conditioner including an impeller, a stator and controllers for controlling the speed of the motor in response to signals related to the amount of petroleum in the water.

7 Claims, 6 Drawing Sheets

(56) References Cited

U.S. PATENT DOCUMENTS

| | | |
|---|---|---|
| 5,425,416 A | 6/1995 | Hammeke et al. |
| 5,431,228 A | 7/1995 | Weingarten et al. |
| 5,443,120 A | 8/1995 | Howell |
| 5,456,837 A | 10/1995 | Peachey |
| 5,482,117 A | 1/1996 | Kolpak et al. |
| 5,484,383 A | 1/1996 | Fitch |
| 5,525,146 A | 6/1996 | Straub |
| 5,565,078 A | 10/1996 | Sams et al. |
| 5,570,744 A | 11/1996 | Weingarten et al. |
| 5,730,871 A | 3/1998 | Kennedy et al. |
| 5,857,519 A | 1/1999 | Bowlin et al. |
| 5,899,270 A | 5/1999 | Watson |
| 5,916,082 A | 6/1999 | Opfer |
| 5,961,841 A | 10/1999 | Bowers |
| 5,988,275 A | 11/1999 | Brady et al. |
| 5,992,521 A | 11/1999 | Bergren et al. |
| 5,996,690 A | 12/1999 | Shaw et al. |
| 6,015,011 A | 1/2000 | Hunter |
| 6,017,456 A | 1/2000 | Kennedy et al. |
| 6,033,567 A | 3/2000 | Lee et al. |
| 6,056,054 A | 5/2000 | Brady et al. |
| 6,068,053 A | 5/2000 | Shaw |
| 6,080,312 A | 6/2000 | Bowers et al. |
| 6,082,452 A | 7/2000 | Shaw |
| 6,089,317 A | 7/2000 | Shaw |
| 6,119,870 A | 9/2000 | Maciejewski et al. |
| 6,131,655 A | 10/2000 | Shaw |
| 6,138,757 A | 10/2000 | Latos et al. |
| 6,138,758 A | 10/2000 | Shaw et al. |
| 6,142,224 A | 11/2000 | Stuebinger et al. |
| 6,152,218 A | 11/2000 | Safargar |
| 6,173,768 B1 | 1/2001 | Watson |
| 6,173,774 B1 | 1/2001 | Fox |
| 6,189,613 B1 | 2/2001 | Chachula et al. |
| 6,196,312 B1 | 3/2001 | Collins et al. |
| 6,196,313 B1 | 3/2001 | Simons |
| 6,202,744 B1 | 3/2001 | Shaw |
| 6,209,641 B1 | 4/2001 | Stevenson |
| 6,234,258 B1 | 5/2001 | Karigan |
| 6,260,619 B1 | 7/2001 | Svedeman et al. |
| 6,283,204 B1 | 9/2001 | Brady et al. |
| 6,328,118 B1 | 12/2001 | Karigan et al. |
| 6,336,503 B1 | 1/2002 | Alhanati et al. |
| 6,336,504 B1 | 1/2002 | Alhanati et al. |
| 6,357,530 B1 | 3/2002 | Kennedy et al. |
| 6,367,547 B1 | 4/2002 | Towers et al. |
| 6,382,316 B1 | 5/2002 | Kintzele |
| 6,382,317 B1 | 5/2002 | Cobb |
| 6,436,298 B1 | 8/2002 | Parkinson |
| 6,494,258 B1 | 12/2002 | Weingarten |
| 6,543,537 B1 | 4/2003 | Kjos |
| 6,547,003 B1 | 4/2003 | Bangash et al. |
| 6,550,535 B1 | 4/2003 | Traylor |
| 6,554,068 B1 | 4/2003 | Chatterji et al. |
| 6,627,081 B1 | 9/2003 | Hilditch et al. |
| 6,672,385 B2 | 1/2004 | Kilaas et al. |
| 6,691,781 B2 | 2/2004 | Grant et al. |
| 6,705,402 B2 | 3/2004 | Proctor |
| 6,719,048 B1 | 4/2004 | Ramos et al. |
| 6,723,158 B2 | 4/2004 | Brown et al. |
| 6,736,880 B2 | 5/2004 | Ford et al. |
| 6,755,250 B2 | 6/2004 | Hall et al. |
| 6,755,251 B2 | 6/2004 | Thomas et al. |
| 6,755,978 B2 | 6/2004 | Oddie |
| 6,761,215 B2 | 7/2004 | Morrison et al. |
| 6,868,907 B2 | 3/2005 | Homstvedt et al. |
| 6,868,911 B1 | 3/2005 | Jacobson et al. |
| 6,923,259 B2 | 8/2005 | Snow |
| 7,093,661 B2 | 8/2006 | Olsen |
| 7,124,816 B2 | 10/2006 | Arebrat |
| 7,152,681 B2 | 12/2006 | Olsen et al. |
| 2002/0084073 A1 | 7/2002 | Underdown et al. |
| 2002/0178924 A1* | 12/2002 | Brown et al. .................. 96/214 |
| 2002/0189807 A1 | 12/2002 | Emanuele et al. |
| 2003/0051874 A1 | 3/2003 | Munson et al. |
| 2003/0079876 A1 | 5/2003 | Underdown |
| 2004/0104027 A1 | 6/2004 | Rossi et al. |
| 2006/0000762 A1 | 1/2006 | Hamid et al. |
| 2006/0037746 A1 | 2/2006 | Wright et al. |

FOREIGN PATENT DOCUMENTS

| | | |
|---|---|---|
| WO | WO 92/00810 | 1/1992 |
| WO | WO 9603566 A2 | 2/1996 |
| WO | WO 9725150 A1 | 7/1997 |
| WO | WO 9837307 A1 | 8/1998 |
| WO | WO 9841304 | 9/1998 |
| WO | WO 0065197 A1 | 11/2000 |
| WO | WO 0123707 A1 | 4/2001 |
| WO | WO 0131328 A1 | 5/2001 |
| WO | WO 0214647 A1 | 2/2002 |
| WO | WO 03/022409 A1 | 3/2003 |
| WO | WO 03062597 A1 | 7/2003 |
| WO | WO 2004/053291 A1 | 6/2004 |

OTHER PUBLICATIONS

Aker Kvaerner, "*Top Separator*" 1 page <http://www.akerkvaerner.com/Internet/IndustriesAndServices/Pulping/Fiberlinerecaust/Co>, visited Sep. 13, 2004.

Aker Kvaerner, "*Kvaerner Process Systems—Process Systems and Complete Process Trains for the Oil and Gas Industry*," 3 pages <http://www.offshore-technology.com/contractors/separation/kvaerner3/>, visited Sep. 13, 2004.

Looksmart, "Downhole Separation Eliminates Premature Oil Well Shut-Ins," *World Oil*, Apr. 1998, 3 pages http://www.findarticles.com/p/articles/mi_m3159/is_n4_219/ai_20872448, visited Sep. 13, 2004.

Gibbs, Walter, "*A Cleaner, Brighter Oil Age*," May 2, 2002, 5 pages http://www.nortrade.com/OilGas/Articles/ShowArticle.aspx?id=27&sectorid=25>, visited Sep. 13, 2004.

Nilsen, Pål, et al, "*A Novel Separator Inlet Design*," 1999, 1 pg. http://www01.se.abb.com/global/gad/gad00393.nsf/0/8a9875a54720ef79c1256ccc0048747>, site visited Sep. 13, 2004.

Stewart Technology Associates, *Overview of STA*, "Recent Installations—Zetapdm," 3 pages <http://www.stewart-usa.com/id73_m.htm>, visited Sep. 13, 2004.

Hart's E&Pnet, "*March: Subsea Processing: Seabed Processing Comes of Age*," Mar. 2000, 5 pages, <http://www.eandpnet.com/ep/previous/0300/seabed.htm>, visited Sep. 13, 2004.

Technology Applications, Mar. 2000, 2 pgs.

Jotne Link, "*Separators From Jotne to Grane*", 2000, 1 pg. http://www.jotne.com/jotnelink/sept00/separators.html>, visited Sep. 13, 2004.

Affleck, Richard Peter, "*Recovery of Xylitol From Fermentation of Model Hemicellulose Hydrolysates Using Membrane Technology*," Dec. 12, 2003, Blacksburg, Virginia, 118 pgs.

Eurolakes, *Integrated Water Resource Management for Important Deep European Lakes and Their Catchment Areas*, "D-15: Technical Considerations part 3—EUROSKIM," Feb. 25, 2002, 59 pgs.

NCSRT, "*OPTISEP 200 & 400 Biopharmaceutical Processing, Flat Sheet Membrane Holder*," 2 pages <http://www.ncsrt.com/web_development/web_site/filt_optisep.htm,>, site visited Sep. 13, 2004.

LeCoffre, Yves, et al, "*Optisep®, A new concept in liquid-liquid separation*," Force Downhole Subsea Processing Seminar, Mar. 16-17, 1999, Stavanger, YLec Consultants, 19 pgs.

Dougherty, Cynthia C., Memorandum to Water Management Division Directors EPA Regions I-X, "Well *Classification Guidance for Downhole Hydrocarbon/Water Separators*", UIC Program Guidance #82, Jan. 5, 2000, 8 pgs.

Kvaerner, KOP Internet, materials from Website, 4 pages <http://www.kop.kvaerner.com>, visited Mar. 22, 2002.

(56) References Cited

OTHER PUBLICATIONS

Wolff, Erik A., et al., "Advanced Electrostatic Internals in the 1st Stage Separator Enhance Oil/Water Separation and Reduce Chemical Consumption on the Troll C Platform," OTC 16321, *Offshore Technology Conference*, Houston, Texas, May 3-6, 2004, pp. 1-7.

"*Quantum Leap in Downhole Separation*," PetroMin, Mar. 2000, pp. 28-31.

Gunnerod, Terje, "*Quantum Leap in Downhole Separation*," prior to Mar. 2000, pp. 7-10.

Verbeek, P.H.J., et al., "*Downhole Separator Produces Less Water and More Oil*," SPE 50617, Society of Petroleum Engineers, Inc., Copyright 1998, pp. 429-434.

"*Downhole Separator Produces Less Water and More Oil*," JPT, Mar. 1999, 2 pages.

Schanke, T., et al., "*Oil in Water Monitoring for Subsea and Downhole Separators*," SPE 66538, Society of Petroleum Engineers, Inc., copyright 2001, pp. 1-6.

Lahann, Joerg, "A Reversibly Switching Surface," *Science Magazine*, vol. 299, pp. 371-374, Jan. 17, 2003.

MIT News, "*MIT's Smart Surface Reverse Properties*," Jan. 16, 2003 <http://web.mit.edu/newsoffice/nr/2003/smartsurface.html>, visited Dec. 3, 2003.

"Chemists Concoct Quick-Change Surface," *Science*, vol. 299, Jan. 17, 2003, pp. 321 and 323.

Huber, Dale L. et al, "Programmed Adsorption and Release of Proteins in a Microfluidic Device," *Science*, vol. 301, Jul. 18, 2003, pp. 352-354.

\* cited by examiner

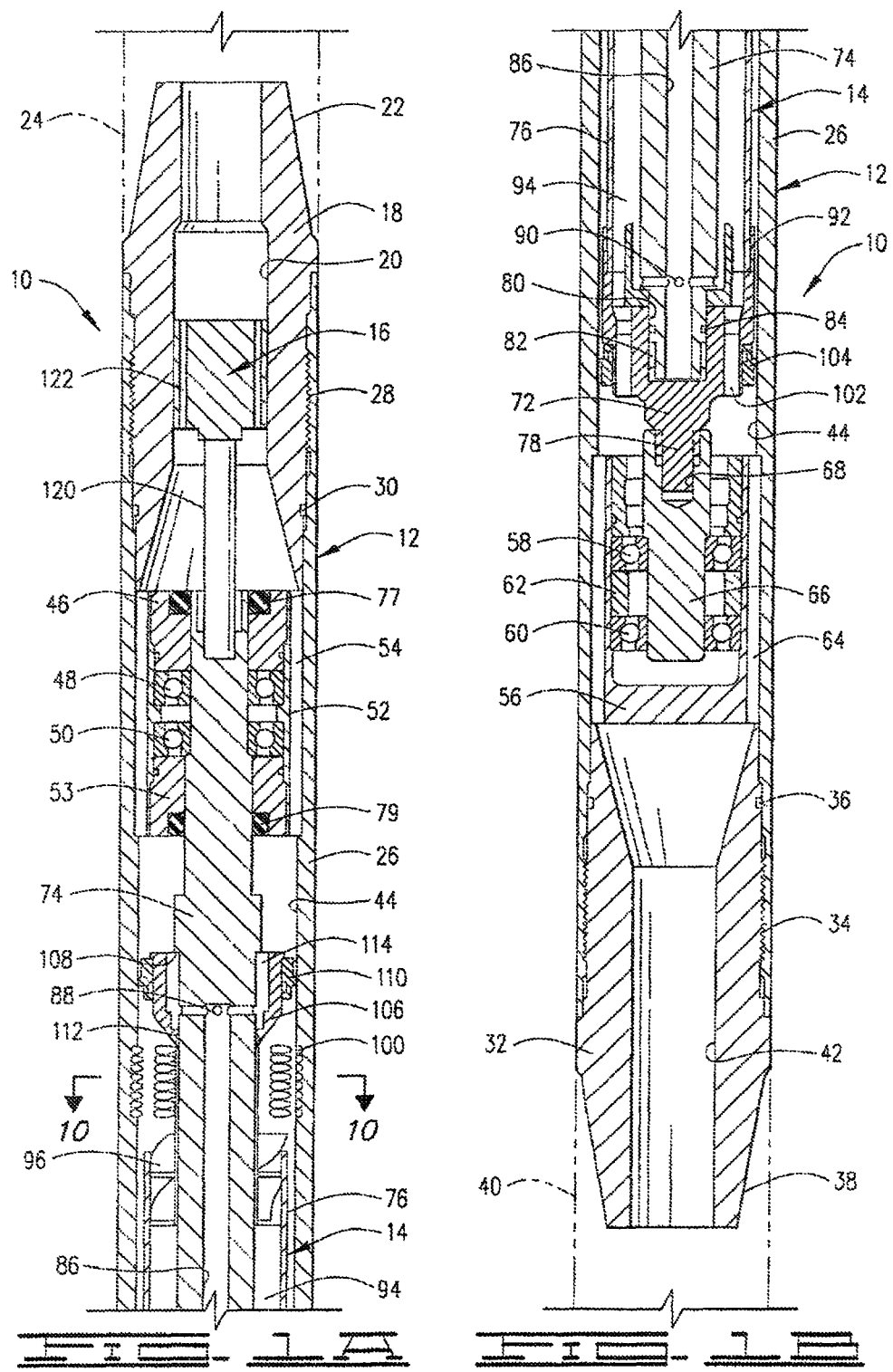

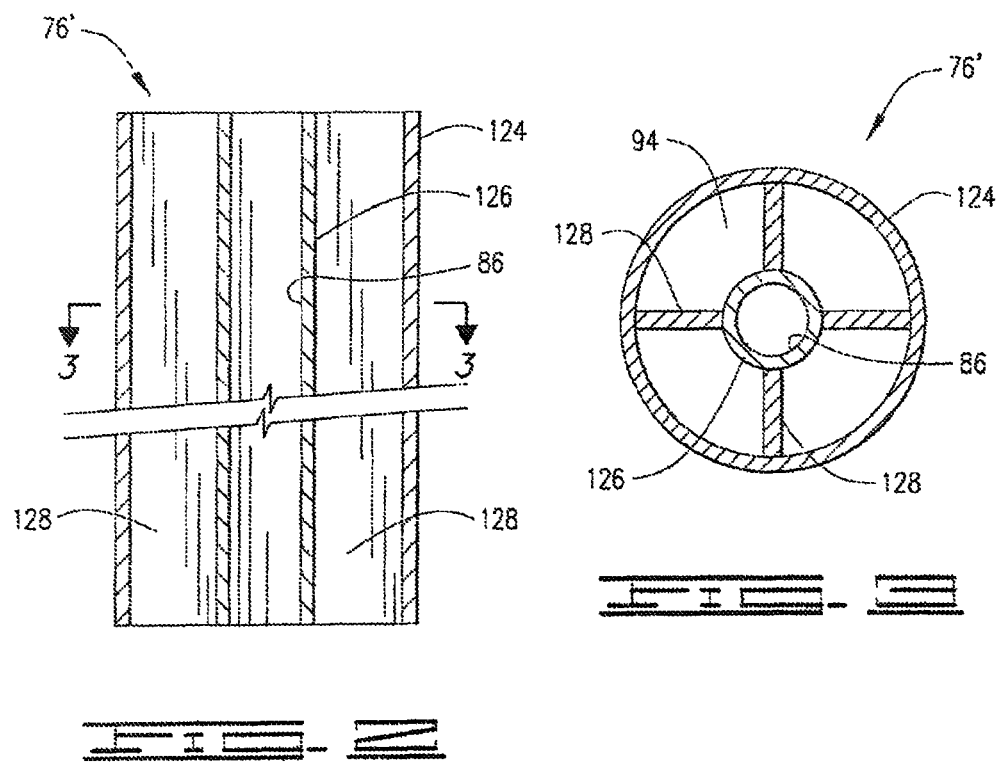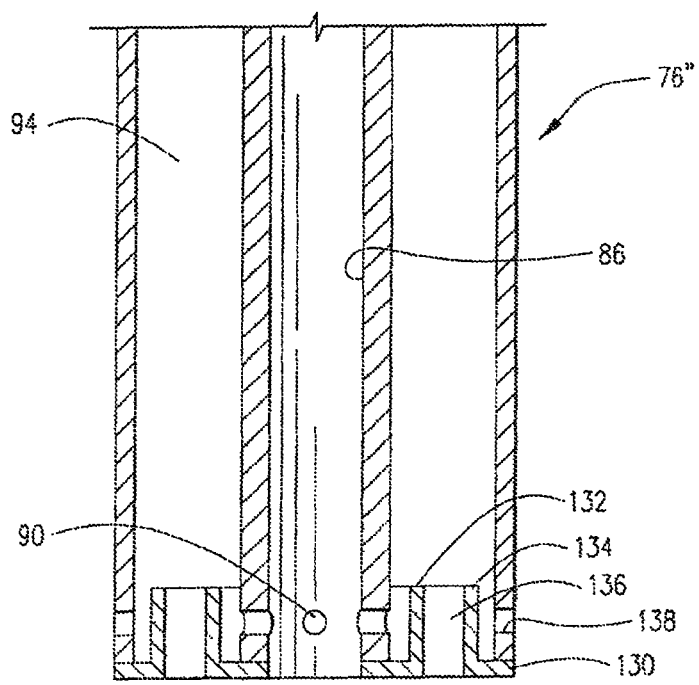

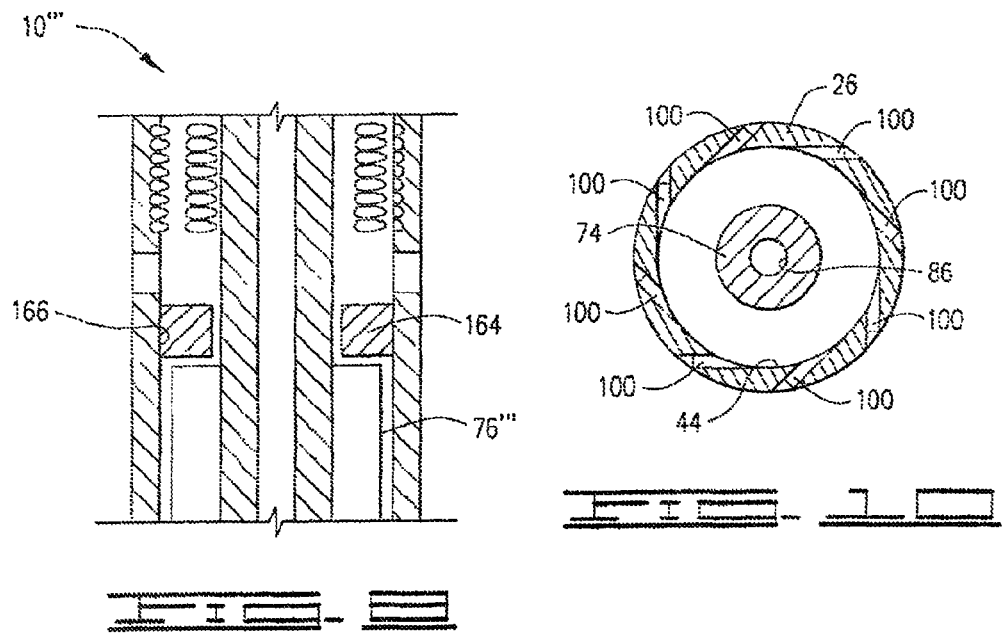
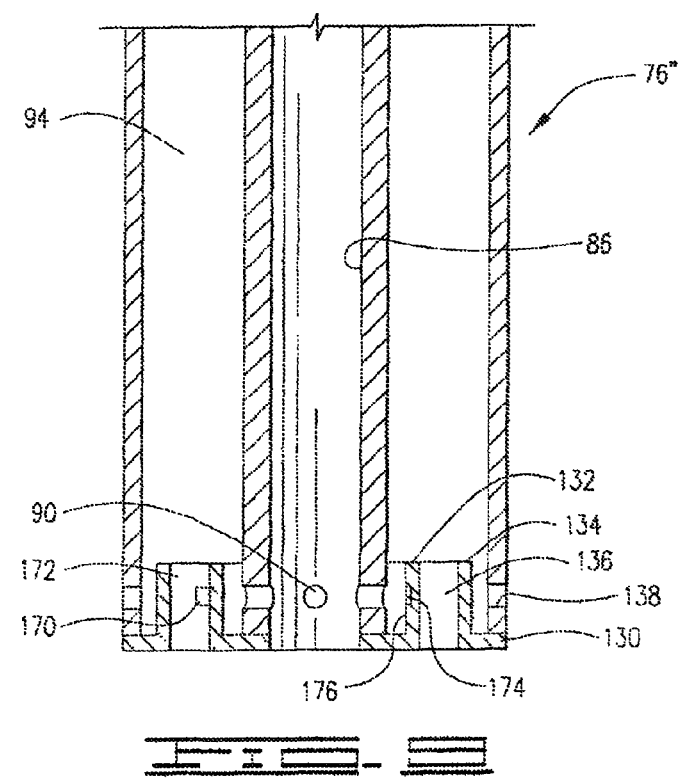

ORBITAL DOWNHOLE SEPARATOR

This application is a divisional application of application Ser. No. 10/692,564 ("Orbital Downhole Separator"), filed Oct. 24, 2003 now abandoned.

BACKGROUND

This invention relates to downhole separators used in oil and gas wells, and in particular, to an orbital downhole separator driven by an internal motor and having a flow conditioner to improve fluid separation and control systems for such separators.

Oil and/or gas wells quite often pass through a productive strata the yield of which includes oil, gas and other valuable products but also includes undesirable and unwanted constituents such as salt water. In oil well production operations, relatively large quantities of water are frequently produced along with the valuable petroleum products. This is particularly true during the latter stages of the producing life of a well. Bringing this water to the surface and handling it there represents a significant expense in lifting, separation and disposal.

Various methods have been employed for extracting the valuable petroleum yield from the unwanted constituents. Some have involved the pumping of the total yield of the well to the surface and then using various methods for separating the valuable products from the unwanted portion. In addition, the unwanted portion of the yield, after having been pumped to the well surface and separated, often has been pumped downwardly again through a remote wellbore into a disposal layer. This, of course, also increases expenses.

In some oil wells, the unwanted constituents can amount to as much as 80% to 90% of the total formation yield. Accordingly, to obtain a given volume of valuable petroleum from the well fluid, eight or nine times the volume of the petroleum must first be pumped to the surface and then separated from the unwanted portion. As already noted, this process can be very slow and expensive. Although the problem of producing substantially water-free oil from the well reservoir may occur at any state in the life of an oil well, the proportion of water to valuable yield generally increases with time as the oil reserves decline. Ultimately, when the lifting cost of the combined petroleum and water constituents exceeds the value of the recovered oil, abandonment of the well becomes the only reasonable alternative.

Many procedures have been tried for producing water-free oil from a formation that has a large quantity of water. For example, the oil and water produced are pumped or otherwise flowed together to the surface where they are treated to separate the petroleum from the water. Since the volume of water is usually much greater than that of the oil, the separator must handle large volumes of fluid and therefore is correspondingly large and expensive. Moreover, the water produced contains mineral salts which are extremely corrosive, particularly in the presence of air. Also, flowing the oil and water together upwardly through the well sometimes forms emulsions that are difficult to break. Such emulsions frequently must be heated in order to separate them even when in the presence of emulsion-treating chemicals. The heating of the large amount of water, as well as the small amount of oil requires an expenditure of large amounts of energy, reducing the net equivalent energy production from the well.

Water produced from deep formations within the earth frequently contains large amounts of natural salts. For this reason, the salt water brought to the surface cannot be disposed of by allowing it to flow into surface drains or waterways. Relatively small amounts of salt water can sometimes be disposed of by draining into a slush pit or evaporation tank. The normally required disposal method for large volumes of salt water, however, is to introduce the water into a subsurface formation. This requires a disposal well for receiving the produced salt water.

By returning the water to the same formation in this manner, the water is disposed of and also acts as a re-pressurizing medium or drive to aid in maintaining the bottomhole pressure for driving the well fluids toward the producing well. But, in those areas where producing wells are widely separated, the cost of drilling disposal wells for each producing well is often prohibitive. In such instances, it is necessary to lay a costly pipeline-gathering network to bring all of the produced water to a central location, or alternatively, to transport the produced water by trucks or similar vehicles. Regardless of the method for transporting the waste salt water from a producing well to a disposal well, the cost of the disposal can be, and usually is, prohibitive. Furthermore, fluids from subterranean reservoirs can have undesirable characteristics such as creating excessive pressure and super-heating of the fluids. If excessive pressure is present, then surface equipment, such as a choke manifold, must be installed to choke the flow pressure down to about 2,000 psi, a manageable pressure. If a highly pressurized fluid depressurizes within a short period of time, then a large portion of the gas is "flashed". This reaction adversely affects the desirable petroleum from the formation yield. In general, both well seals and surface equipment suffer in the presence of excessive fluid pressure and heat. This equipment is expensive in terms of maintenance and capital costs. Thus, it is highly desirable to minimize these undesirable characteristics of the well flow before being brought to the surface.

Downhole separation of water from oil in a well is a desirable approach for disposal of formation water in the well. It eliminates or reduces the excessive costs discussed above required to pump the water to the surface and dispose of it. Furthermore, the greatly reduced environmental impact of the produced water is another factor in making this approach attractive.

Earlier downhole separators are shown in U.S. Pat. Nos. 5,156,586; 5,484,383; and 6,367,547.

The use of downhole separators eliminates or reduces the excessive costs discussed above to pump the water and dispose of it. Furthermore, the greatly reduced environmental impact of the produced water is another factor in making this approach attractive.

Improvements of prior art separators are desirable to further improve efficiency. The present invention includes a separator with a rotating cylinder and a variety of flow conditioners to increase the efficiency of the separator. One embodiment of the present invention adds an impeller to pump the fluid into an annulus to increase tangential fluid velocities. In another, a stator is used to orient the fluid to enter the impeller with a minimum of shearing action. In still another, baffles are positioned in an annular space in the rotor to force the fluid to rotate at the shaft velocity which will improve the separation efficiency.

In another embodiment, a multi-lip cup designed to facilitate multi-density substances so that they are separated into different conduits is used.

In another embodiment, a smart controller is used to control the speed of the motor to modulate the oil concentration in the outlet water. This control function is achieved without the use of a sensor for oil-concentration feedback by measuring the voltage and the current of the motor. The voltage is a measure of the rotor speed, and the current is a function of the applied torque. The torque in turn varies with the water-cut (the ratio of water to oil). By establishing the relationship between the torque and the water-cut and the speed, the motor speed can be adjusted to operate at the desired set point.

A further embodiment utilizes a speed control which has an oil-in-water concentration sensor feedback in conjunction with a conventional PID controller or an adaptive controller for the control function. The motor speed is adjusted to achieve the oil concentration in the out fluid stream on the water side. One way of doing this includes using a valve on the downstream side of the water side which is modulated to achieve the quality of the water to be re-injected. A conventional controller is used to regulate the valve in response to the operating conditions to obtain a desired set-point of the oil content in the re-injection water. An adaptive controller can also be used to control the speed of the motor or the position of the valve using an adaptive algorithm for the controller to drive the concentration of the oil to the desired value.

SUMMARY

The present invention is a downhole separator designed to separate components of well fluids within the well without the necessity of pumping the fluids to the surface first. The separator may be said to comprise a housing adapted for connection to a tool string for use in a well, a cylinder rotatably disposed in the housing and defining a flow passage therein, and a motor disposed in the housing for rotating the cylinder, whereby fluid flowing through the housing enters the flow passage and is subjected to centrifugal force such that the fluid is separated into different components having different specific gravities. The separator may further comprise a flow conditioner for facilitating the separation of the fluids. The invention includes several different flow conditioners.

One version of the flow conditioner comprises an impeller adjacent to the inlet of the cylinder for pumping fluid into the flow passage. The impeller is preferably attached to the cylinder.

In another embodiment, the flow conditioner comprises a baffle disposed in the flow passage in the cylinder to reduce slippage of fluid in the rotating cylinder. Preferably, the baffle is one of a plurality of angularly spaced baffles which extend longitudinally through the cylinder.

In another embodiment, the cylinder defines an oil port and a sand port therein, and the flow conditioner comprises a cup disposed adjacent to an end of the cylinder. The cup has a first lip adjacent to the oil port and a second lip adjacent to the sand port. The first and second lips define an annular water passage therebetween, wherein the first lip directs separated oil through the oil port, the second lip directs separated sand and water mixture through the sand port, and water is directed through the water passage. The first and second lips are preferably substantially concentric.

In another embodiment, the motor is a variable speed motor, and the flow conditioner comprises an oil-in-water sensor in communication with separated water discharged from the cylinder, the sensor generating an oil concentration signal in response to a concentration of oil in the discharged water, and a controller connected to the motor for varying the speed of the motor in response to the oil concentration signal compared to a predetermined desired oil concentration in the discharged water. The controller may be, for example, an adaptive controller of a PID controller.

In an additional embodiment where the motor is a variable speed motor, the flow conditioner comprises a valve in communication with oil discharged from the cylinder to control the flow of the oil, an actuator adapted for opening and closing the valve, an oil-in-water sensor in communication with separated water discharged from the cylinder to wherein the sensor generates an oil concentration signal in response to a concentration of oil in the discharged water, and a controller connected to the actuator whereby the valve is actuated in response to the oil concentration signal compared to a predetermined desired oil concentration in the discharged water, such that the flow of oil from the cylinder is controlled to vary the time the fluid is in the cylinder and thereby correspondingly varying the amount of oil separated from the water.

In still another embodiment, the motor is again a variable speed motor, and the flow conditioner comprises a smart controller connected to the motor for varying the speed of the motor in response to a function of voltage and current signals from the motor compared to a predetermined desired value of a function corresponding to the water-cut.

Another version of the flow conditioner comprises a stator adjacent to an inlet end of the cylinder. The stator preferably comprises a plurality of vanes for starting rotation of the fluid as it enters the cylinder.

In one more embodiment, the cylinder defines a first port and a second port therein, and the flow conditioner comprises a cup disposed adjacent to a discharge end of the cylinder. The cup has a first lip adjacent to the first port, a second lip adjacent to the second port, the first and second lips defining an annular passage therebetween. This flow conditioner also comprises a sensor disposed adjacent to the cup for measuring the capacitance of fluid flowing thereby such that an operator can determine the separation of the components of the fluid. Preferably, the sensor is a capacitance-type sensor disposed adjacent to the first lip and first port. One example of the sensor is a MEMS sensor embedded in a surface of the cup facing the annular passage. Capacitance data from the sensor may be transmitted wirelessly to the surface of downhole controller, using telemetry, such as EM telemetry.

Stated in another way, the orbital downhole separator comprises a housing adapted for connection to a tool string for use in a well, a rotating member disposed in the housing, a motor disposed adjacent to the housing and connected to the rotating member whereby fluid flowing through the rotating member is subjected to centrifugal force such that the fluid is separated into heavier and lighter components, and a flow conditioner for facilitating the separation of the fluid in the rotating member.

Numerous objects and advantages of the invention will be understood by those skilled in the art when the following detailed description of the preferred embodiments is read in conjunction with the drawings illustrating such embodiments.

BRIEF DESCRIPTION OF THE DRAWINGS

FIGS. 1A and 1B show a longitudinal cross section of an orbital downhole separator of the present invention.

FIG. 2 illustrates an embodiment of an orbital downhole separator with a rotating cylinder having baffles therein.

FIG. 3 is a cross-sectional view taken along lines 3-3 in FIG. 2.

FIG. 4 illustrates the use of a multi-lip cup with the orbital downhole separator.

FIG. 8 shows an embodiment having a stator to increase rotation of the fluid at the inlet of an impeller.

FIG. 9 illustrates a sensor for determining oil-in-water concentration of the fluid.

FIG. 10 is a cross section taken along lines 10-10 in FIG. 1A.

DESCRIPTION

Figure 5:
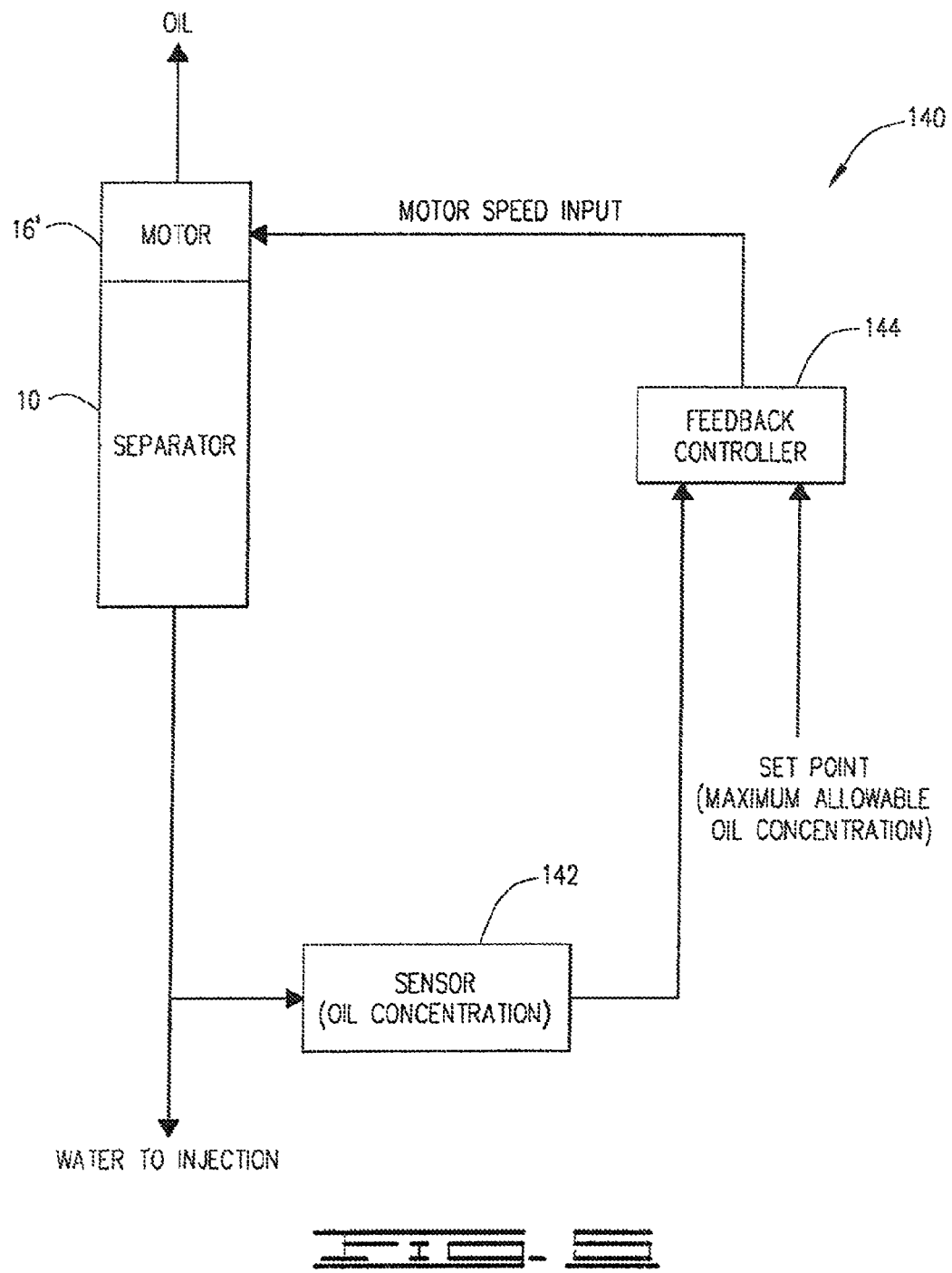
FIG. 5 schematically shows how a feedback controller can be used to control the speed of a motor in the separator.

Referring now to the drawings and more particularly to FIGS. 1A and 1B, an orbital downhole separator of the present invention is shown and generally designated by the numeral 10. Separator 10 generally comprises a housing 12 with a rotor 14 rotatably disposed therein. Rotor 14 is driven by an electric motor 16.

Housing 12 comprises an upper adapter 18 with a central opening 20 therethrough. Upper adapter 18 has an external thread 22 adapted for connection to an upper tool string portion 24. Upper adapter 18 is attached to a tubular member 26 by a threaded connection 28. A seal 30 provides sealing engagement between upper adapter 18 and tubular member 26.

Housing 12 further comprises a lower adapter 32 attached to tubular member 26 by a threaded connection 34. A seal 36 provides sealing engagement between tubular member 26 and lower adapter 32. Lower adapter 32 has an external thread 38 adapted for engagement with a lower tool string portion 40 if desired. Lower adapter 32 further defines a central opening 42 therethrough.

Tubular member 26 defines a central opening 44 therethrough which is in communication with central opening 20 in upper adapter 18 and central opening 42 in lower adapter 32.

A first upper seal housing 46 is disposed in central opening 44 of tubular member 26 adjacent to upper adapter 18. Below first upper seal housing 46 is a first upper bearing 48 and a second upper bearing 50 therein, and the first upper bearing 48 and second upper bearing 50 are separated by an upper spacer 52. Below second upper bearing 50 is a second upper seal housing 53.

Upper spacer 52 defines an upper flow passage 54 therethrough.

A lower bearing housing 56 is disposed in central opening 44 of tubular member 26 adjacent to lower adapter 32. Lower bearing housing 56 has a first lower bearing 58 and a second lower bearing 60 therein, and the first lower bearing 58 and second lower bearing 60 are separated by a lower spacer 62.

Lower bearing housing 56 defines a lower flow passage 64 longitudinally therethrough.

A bearing shaft 66 is disposed through, and supported by, first and second lower bearings 58 and 60. Bearing shaft 66 defines a central opening 68 in an upper end thereof.

Rotor 14 comprises a stub shaft 72, a main shaft 74 and a rotating cylinder 76 positioned around the stub shaft 72 and main shaft 74. Main shaft 74 and a rotating cylinder 76 form a rotating member within housing 12.

An upper end of main shaft 74 extends into, and is supported by, first upper bearing 48 and second upper bearing 50. Seal 77 provides sealing engagement between main shaft 74 and first upper seal housing 46 above first upper bearing 48, and seal 79 provides sealing engagement between main shaft 74 and second upper seal housing 53 below second upper bearing 50.

Stub shaft 72 extends into central opening 68 in bearing shaft 66 and is connected thereto by a spline 78. Stub shaft 72 defines a central opening 80 therein into which a lower portion of main shaft 74 extends. Main shaft 74 is attached to stub shaft 72 by a threaded connection 82. A seal 84 provides sealing engagement between stub shaft 72 and threaded connection 82.

Main shaft 74 defines a central opening 86 therethrough. A plurality of radially extending upper ports 88 are in communication with central opening 86. A plurality of radially extending lower ports 90 are also in communication with central opening 86.

Rotating cylinder 76 is attached to stub shaft 72 at press-fit connection 92. By this connection and others previously described, it will be seen by those skilled in the art that bearing shaft 66, stub shaft 72, main shaft 74 and rotating cylinder 76 rotate together. Rotating cylinder 76 and main shaft 74 define an annular flow passage 94 therebetween.

The present invention comprises a number of different flow conditioners to improve the efficiency of the separations of the fluids flowing therethrough. In FIG. 1A, the flow conditioner is characterized by an impeller 96 at the upper end of rotating cylinder 76. Impeller 96 is positioned in annular flow passage 94 and facilitates flow through the annular flow passage 94, as will be further described herein.

At least one inlet port 100 is defined in tubular member 26 adjacent to impeller 96. Preferably, but not by way of limitation, inlets ports 100 are substantially tangentially disposed as best seen in FIG. 10.

Stub shaft 72 has a plurality of longitudinally extending flow ports 102 therein which provide communication between lower flow passage 64 and annular flow passage 94. A lower seal 104 provides sealing between rotating stub shaft 72 and stationary tubular member 26 of housing 12.

A seal adapter 106 is mounted on main shaft 74 adjacent to a shoulder 108 on the main shaft 74 below second upper seal housing 53. An upper seal 110 provides sealing engagement between seal adapter 106 and tubular member 26. Another seal 112 provides sealing engagement between seal adapter 106 and main shaft 74.

A channel 114 is formed in seal adapter 106 and is aligned, and in communication, with upper ports 88 in main shaft 74. Channel 114 is also in communication with upper flow passage 54 in upper spacer 52.

Motor 16 is positioned in central opening 20 of upper adapter 18. Motor 16 is adapted to drive a coupler shaft 120 which is connected to main shaft 74. In other words, coupler shaft 120 interconnects motor 16 and rotor 14. Wiring (not shown) connects motor 16 to a source of electrical power (not shown). When motor 16 is energized, coupler shaft 120 is rotated which causes main shaft 74 and the other components of rotor 14 to be rotated within housing 12.

A plurality of longitudinally extending holes 122 are defined through motor 16, and it will be seen that these holes 122 are in communication with upper flow passage 54 in upper spacer 52.

In operation, separator 10 is made up on a tool string of which upper tool string portion 24 and lower tool string portion 40 are components. This tool string assembly is lowered to the desired location in the wellbore. When it is desired to start a separation process for fluid in the well, motor 16 is actuated. Well fluid enters separator 10 through inlet port 100, and the fluid is forced into annular flow passage 94. The rotation of rotating cylinder 76 applies centrifugal force to the fluid in annular flow passage 94. This causes the heavier water to be separated from the lighter oil or gas. That is, the water and other higher density materials, such as sand, are forced radially outwardly in annular flow passage 94, and the oil or gas (lighter components) stays to the inside.

In the embodiment using impeller 96 as the flow conditioner, the impeller 96 acts to drive the fluid in a tangential direction. The pressure in the well annulus forces the oil or gas through lower ports 90 in main shaft 74 so that it enters central opening 86 in the main shaft 74. The oil or gas is forced upwardly through central opening 86, and it exits main shaft 74 through upper ports 88 therein. The oil or gas continues to flow upwardly through central opening 44 in tubular member 26, upper flow passage 54, holes 12, central opening 20 in upper adapter 18 and up through upper tool string portion 24 to the surface for recovery.

Water is forced through flow ports 102, central opening 44 below stub shaft 72, lower flow passage 64, central opening 42 in lower adapter 32 and on down through lower tool string portion 40 for disposal in the well.

Referring now to FIGS. 2 and 3, a second flow conditioner in the form of an improved rotating cylinder is shown and designated by the numeral 76'. Rotating cylinder 76 is similar to rotating cylinder 76 in that it has an outer cylinder 124 and an inner cylinder 126 which define the previously mentioned annular flow passage 94 therebetween. In improved rotating cylinder 76', a plurality of longitudinal baffles 128 are disposed in annular flow passage 94 and extend the length thereof.

The fluid may slip within rotating cylinder 76 (that is, it may not rotate with the rotating cylinder 76', the fluid is forced to rotate within the rotating cylinder 76' because the fluid is held between inner cylinder 126 and outer cylinder 124 by baffles 128, thus reducing the potential for fluid slip, and this improved the separation of the water from the oil or gas.

Referring now to FIG. 4, a third flow conditioner is shown which provides for the separation of sand from at least some of the water. Again, most of the components are the same as in separator 10. However, at the lower end of a modified rotating cylinder 76", a multi-lip cup 130 is disposed in annular flow passage 94.

Cup 130 has an inner lip 132 adjacent to lower ports 90 and an outer lip 134 generally concentric with the inner lip 132. An annular port 136 is defined between inner lip 132 and outer lip 134. Rotating cylinder 76" defines a plurality of radially disposed ports 138 therein adjacent to outer lip 134.

If there is sand in the fluid to be separated, it is sometimes desirable to separate this from the water and oil or gas. Cup 130 facilitates this separation. As the components of the fluid are subjected to the centrifugal force previously discussed, the water and sand are forced outwardly from the lighter oil or gas. Further, the sand will be forced outwardly against the wall of rotating cylinder 76'. As the separated fluid components flow inside inner lip 132 and out lower ports 90 as previously discussed. The sand, still mixed with some water, will flow outside of outer lip 134 and out ports 138 in rotating cylinder 76". The bulk of the water, with the sand now separated therefrom, will flow downwardly through annular port 136. Thus, the second embodiment allows handling of sand as well as water and oil or gas. It will be seen by those skilled in the art that this use of cup 130 could be used to accommodate fluids with other various density components and is not limited to just sand, water and oil or gas.

Referring now to FIG. 5 a fourth flow conditioner for downhole orbital separator is shown schematically to include a speed control 140 for a variable speed motor 16'. Speed control 140 comprises an oil-in-water sensor 142 in communication with the water discharged from separator 10 after separation of the water from the oil or gas. Sensor 142 send an oil concentration signal to a feedback controller 144. A conventional PID (proportional integral derivative) controller could also be used.

The oil concentration signal is compared to a predetermined maximum desired oil concentration level. The speed of motor 16' is adjusted to achieve the desired oil concentration level as necessary even though the mixture of water and oil or gas from the well may very. The amount of centrifugal force applied to the fluid varies with the speed of motor 16'.

Figure 6:
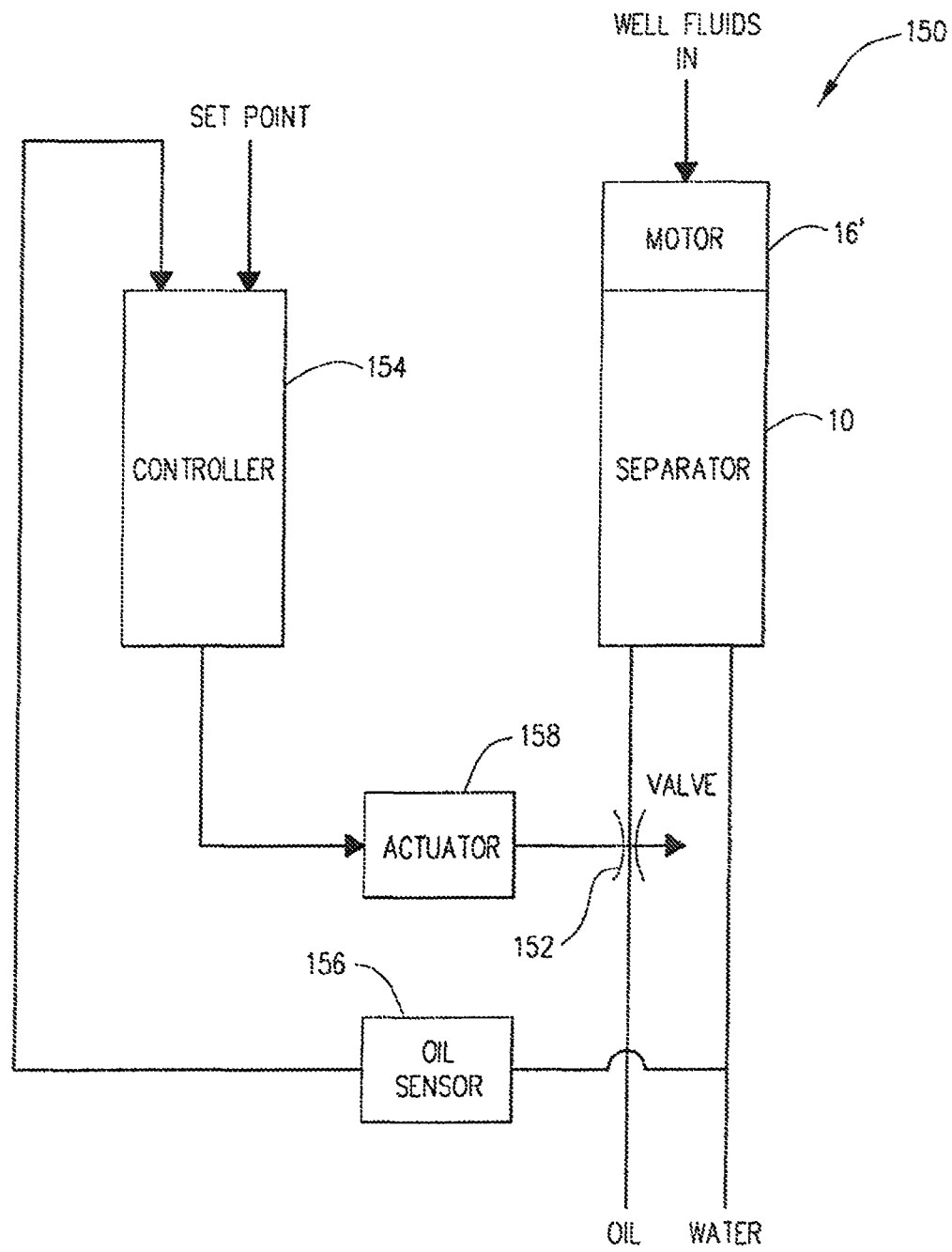
FIG. 6 is a schematic of a valve-based speed control for the motor.

Referring to FIG. 6, a fifth flow conditioner in the form of a valve-based control 150 for separator 10 is shown schematically. A valve 152 is used on the downstream side of the water side which is modulated to achieve the quality of the water to be re-injected into the well. A conventional controller 154 receives an oil concentration signal from an oil-in-water sensor 156 and compares it to a predetermined desired level. Controller 154 then sends an actuator signal to a valve actuator 158 to regulate valve 152 to vary the flow therethrough. Controlling the rate at which water is discharged from separator 10 affects how long it is subjected to the centrifugal force. Thus, the desired oil content in the water is achieved.

It will be seen by those skilled in the art that speed control 140 can be combined with valve-based control 150 using an adaptive algorithm to control both the speed of motor 16' and the actuation of valve 152.

Figure 7:
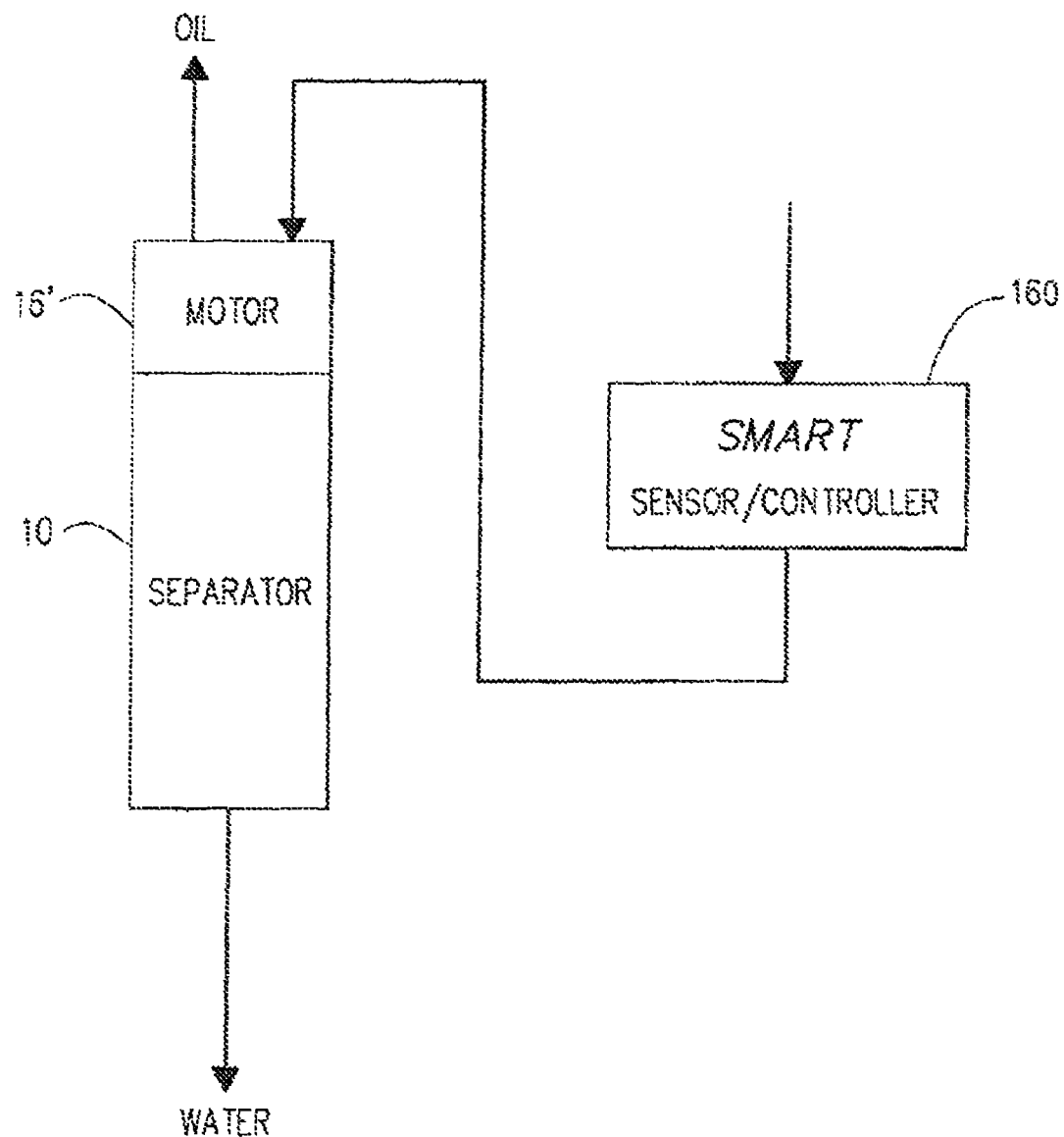
FIG. 7 shows a schematic of a smart sensor system.

Now referring to FIG. 7, a sixth flow conditioner characterized by a smart sensor/controller 160 is illustrated schematically for controlling separator 10. Like speed control 140 of the third embodiment, smart sensor/controller 160 controls the speed of a variable speed motor 16' in separator 10 to achieve the desired oil concentration level in the water. However, with smart sensor/controller 160 an oil-in-water sensor is not required. The voltage, V, and current, I, of motor 16' are measured. The voltage, V, is a function of the speed of the rotor in the motor 16', and the current, I, is a function of the applied torque on the rotor. The torque in turn varies with the amount of separation of water from the oil or gas (the water-cut). By establishing the relationship between the torque and the water-cut and the speed of motor 16', the speed of the motor 16' can be adjusted to operate at the desired speed.

Referring now to FIG. 8, a seventh flow conditioner in a separator 10''' is shown. Separator 10''' is substantially the same as separator 10 except that a stationary stator 164 is used adjacent to a rotating cylinder 76'''. Stator 164 has a plurality of vanes 166 which direct flow to rotating cylinder 76''' in a tangential direction to force the fluid to start rotating before it actually enters the rotating cylinder 76''' which enhances fluid separation. In other words, stator 164 starts the fluid rotating before it enters rotating cylinder 76'''. Stator 164 could be used in conjunction with impeller 96.

Referring now to FIG. 9 an eighth flow conditioner is shown using a sensor 170 to measure the capacitance of the fluid to determine the quality of the separation of the water from the oil or gas. Sensor 170 is used in conjunction with previously described cap 130. Sensor 170 may be a capacitance-type sensor to measure the capacitance of the fluids in annular space 172 in cup 130. Alternatively, a MEMS (micro electromechanical systems) sensor 174 may be embedded in surface 176 of cup 130 to measure the local capacitance of an oil film that forms there. The capacitance data may be transmitted wirelessly using EM telemetry or through some commutation scheme.

Those skilled in the art will see that the different flow conditioners of the present invention can be combined in various ways to provide even more controlled separation.

It will be seen, therefore, that the separator 10 of the present invention and the various flow conditioners thereof are well adapted to carry out the ends and advantages mentioned as well as those inherent therein. While preferred embodiments of the invention have been shown for the purposes of this disclosure, numerous changes in the arrangement and construction is well adapted to carry out the ends and advantages of parts may be made by those skilled in the art. All such changes are encompassed within the scope and spirit of the appended claims.

What is claimed is:

1. A downhole fluid separator comprising:
a housing adapted to connect to a tool string;
a cylinder rotatably disposed in the housing and defining a flow passage therein;
a flow conditioner comprising a longitudinal baffle disposed in the flow passage extending along substantially an entire length of the cylinder, wherein fluid flowing through the housing enters the flow passage and is subjected to centrifugal force such that the fluid is separated into different components having different specific gravities;
a first passage to direct a first component of the fluid toward a first direction;
a second passage to direct a second component of the fluid toward a second, opposite direction; and
an outer cylinder rotatable with the cylinder, wherein the cylinder, the outer cylinder, and the baffle are rotatable together.

2. A downhole fluid separator comprising:
a housing adapted to connect to a tool string;
a rotating member disposed in the housing and defining a flow passage, wherein fluid flowing through the rotating member is subjected to centrifugal force such that the fluid is separated into heavier and lighter components, and the rotating member comprises an inner cylindrical member and an outer cylindrical member and the flow passage is formed in an annular space between the inner and outer cylindrical members;
a flow conditioner comprising a longitudinal baffle disposed in a flow passage along substantially an entire length of the rotating member, where the baffle is one of a plurality of angularly shaped baffles extending radially in the flow passage between the inner and outer cylindrical members;
a first passage to direct a first component of the fluid toward a first direction; and
a second passage to direct a second component of the fluid toward a second, opposite direction
wherein the first passage is formed through an interior of the inner cylindrical member and is in communication with the flow passage.

3. A downhole fluid separator comprising:
a housing adapted to connect to a tool string;
a cylinder rotatably disposed in the housing and defining a flow passage therein;
a flow conditioner comprising a longitudinal baffle disposed in the flow passage extending along a length of the cylinder, wherein fluid flowing through the housing enters the flow passage and is subjected to centrifugal force such that the fluid is separated into different components having different specific gravities;
an outer cylinder rotatable with the cylinder, wherein the cylinder, the outer cylinder, and the baffle are rotatable together;
a first passage to direct a first component of the fluid toward a first direction; and
a second passage to direct a second component of the fluid toward a second, opposite direction.

4. The separator of claim 3, wherein the baffle is one of a plurality of angularly spaced baffles and wherein the plurality of angularly spaced baffles extend radially between the cylinder and the outer cylinder.

5. The separator of claim 4, wherein the plurality of radially extending members are coupled at respective ends to the cylinder and the outer cylinder.

6. The separator of claim 4, wherein the first passage is formed through an interior of the inner cylindrical member and is in communication with the flow passage.

7. A downhole fluid separator comprising:
a housing adapted to connect to a tool string;
a rotating member disposed in the housing and defining a flow passage, wherein fluid flowing through the rotating member is subjected to centrifugal force such that the fluid is separated into heavier and lighter components, the rotating member comprising an inner cylindrical member and an outer cylindrical member, the flow passage formed in an annular space between the inner and outer cylindrical members;
a flow conditioner comprising a longitudinal baffle disposed in a flow passage along a length of the rotating member, the baffle comprising one of a plurality of angularly shaped baffles extending radially in the flow passage;
a first passage to direct a first component of the fluid toward a first direction, the first passage formed through an interior of the inner cylindrical member and is in communication with the flow passage; and
a second passage to direct a second component of the fluid toward a second, opposite direction.

* * * * *